(12) United States Patent
Jack et al.

(10) Patent No.: US 8,378,545 B2
(45) Date of Patent: Feb. 19, 2013

(54) ELECTRICAL ROTARY MACHINE ASSEMBLY WITH STATOR CORE SECTIONS

(75) Inventors: Alan Jack, Hexham (GB); Edwin Pinguey, Carlisle (GB); Göran Nord, Helsingborg (SE)

(73) Assignee: Hoganas AB (Publ), Hoganas (SE)

( * ) Notice: Subject to any disclaimer, the term of this patent is extended or adjusted under 35 U.S.C. 154(b) by 35 days.

(21) Appl. No.: 11/990,708

(22) PCT Filed: Aug. 24, 2006

(86) PCT No.: PCT/SE2006/000973
§ 371 (c)(1),
(2), (4) Date: May 21, 2008

(87) PCT Pub. No.: WO2007/024184
PCT Pub. Date: Mar. 1, 2007

(65) Prior Publication Data
US 2009/0243406 A1    Oct. 1, 2009

(30) Foreign Application Priority Data
Aug. 26, 2005    (SE) ...................... 0501918

(51) Int. Cl.
*H02K 21/14*    (2006.01)
*H02K 21/12*    (2006.01)
*H02K 16/02*    (2006.01)
(52) U.S. Cl. ................ 310/156.55; 310/44; 310/156.36; 310/257
(58) Field of Classification Search .............. 310/44, 310/156.36, 156.55, 178, 257, 49.02; *H02K 16/00, H02K 16/02, 21/12, 21/14*
See application file for complete search history.

(56) References Cited

U.S. PATENT DOCUMENTS
(Continued)

FOREIGN PATENT DOCUMENTS
JP    1144337 A    6/1989
JP    1190249    7/1989
(Continued)

OTHER PUBLICATIONS

Australian Search Report on Patent Application No. 2006282123 dated Jul. 22, 2009.

(Continued)

*Primary Examiner* — Quyen Leung
*Assistant Examiner* — Michael Andrews
(74) *Attorney, Agent, or Firm* — Buchanan Ingersoll & Rooney

(57) ABSTRACT

An electrical rotary machine is provided comprising a first stator core section being substantially circular and including a plurality of teeth, a second stator core section being substantially circular and including a plurality of teeth, a coil arranged between the first and second circular stator core sections, and a rotor including a plurality of permanent magnets. The first stator core section, the second stator core section, the coil and the rotor are encircling a common geometric axis, and the plurality of teeth of the first stator core section and the second stator core section are arranged to protrude towards the rotor. Additionally, the teeth of the second stator core section are circumferentially displaced in relation to the teeth of the first stator core section, and the permanent magnets in the rotor are separated in the circumferential direction from each other by axially extending pole sections made from soft magnetic material.

23 Claims, 10 Drawing Sheets

U.S. PATENT DOCUMENTS

| | | | | |
|---|---|---|---|---|
| 3,411,059 | A * | 11/1968 | Toshimasa | 310/156.55 |
| 4,639,627 | A * | 1/1987 | Takekoshi et al. | 310/156.22 |
| 5,452,590 | A * | 9/1995 | Vigili | 310/67 R |
| 6,211,593 | B1 * | 4/2001 | Nashiki | 310/156.33 |
| 6,486,576 | B1 * | 11/2002 | Yura et al. | 310/49.24 |
| 6,504,272 | B2 | 1/2003 | Sakamoto | |
| 6,683,397 | B2 | 1/2004 | Gauthier et al. | |
| 6,703,741 | B1 | 3/2004 | Ifrim | |
| 6,774,512 | B2 | 8/2004 | Takagi et al. | |
| 6,897,579 | B2 * | 5/2005 | Aoshima | 310/49.32 |
| 7,466,057 | B2 * | 12/2008 | Imai et al. | 310/257 |
| 2002/0070627 | A1 * | 6/2002 | Ward et al. | 310/254 |
| 2002/0074891 | A1 * | 6/2002 | Gieras et al. | 310/254 |
| 2003/0057784 | A1 * | 3/2003 | Kanebako | 310/90.5 |
| 2003/0062792 | A1 * | 4/2003 | Reiter et al. | 310/156.56 |
| 2004/0212267 | A1 * | 10/2004 | Jack et al. | 310/156.56 |
| 2004/0263003 | A1 * | 12/2004 | Jack et al. | 310/14 |

FOREIGN PATENT DOCUMENTS

| | | | |
|---|---|---|---|
| JP | 1190249 | A | 7/1989 |
| JP | 01190249 | A * | 7/1989 |
| JP | 04-161051 | | 6/1992 |
| JP | 04161051 | A * | 6/1992 |
| JP | 3083881 | | 11/2001 |
| JP | 2002027722 | A | 1/2002 |
| JP | 2004260960 | A | 9/2004 |
| JP | 2005151785 | | 6/2005 |
| WO | WO 2005027309 | A1 * | 3/2005 |

OTHER PUBLICATIONS

English translation of Office Action issued Nov. 12, 2010 in corresponding JP Appln No. 2008-527876.

* cited by examiner

ELECTRICAL ROTARY MACHINE ASSEMBLY WITH STATOR CORE SECTIONS

TECHNICAL FIELD OF THE INVENTION

The present invention generally relates to a rotary machine. More particularly this invention relates to an electrical, rotary machine, comprising a first stator core section including a plurality of teeth and being substantially circular, a second stator core section including a plurality of teeth and being substantially circular, a coil arranged between the first and second circular stator core sections, and a rotor including a plurality of permanent magnets. Further, the first stator core section, the second stator core section, the coil and the rotor are encircling a common geometric axis, and the plurality of teeth of the first stator core section and the second stator core section are arranged to protrude towards the rotor.

BACKGROUND OF THE INVENTION

In later years electric machine designs evolved from modulated pole machines, claw pole machines, Lundell machines and transverse flux machines (TFM), have become more and more interesting. Electric machines using the principles of these machines was disclosed as early as about 1910 by Alexandersson and Fessenden.

One of the most important reasons for the increasing interest is that the design enables a very high torque output in relation to, for example, induction machines, switched reluctance machines and even permanent magnet brushless machines. Further, such machines are advantageous in that the coil often is easy to manufacture. However, one of the drawbacks of the design is that they are typically relatively expensive to manufacture and that they experience a high leakage flux, which decreases the performance and efficiency of the machine.

SUMMARY OF THE INVENTION

It is, therefore, an object of the present invention to provide an electric, rotary machine with increased performance.

The object of the invention is achieved by means of an electric, rotary machine according to claim 1 and by means of an electrical, rotary machine according to claim 12. Embodiments of the invention are disclosed in the dependent claims.

In particular, according to one aspect of the invention, an electrical, rotary machine comprises a first stator core section being substantially circular and including a plurality of teeth, a second stator core section being substantially circular and including a plurality of teeth, a coil arranged between the first and second circular stator core sections, and a rotor including a plurality of permanent magnets. The first stator core section, the second stator core section, the coil and the rotor are encircling a common geometric axis, and the plurality of teeth of the first stator core section and the second stator core section are arranged to protrude towards the rotor. Additionally the teeth of the second stator core section are circumferentially displaced in relation to the teeth of the first stator core section, and the permanent magnets in the rotor are separated in the circumferential direction from each other by axially extending pole sections made from soft magnetic material.

One advantage of this arrangement is that the magnetic flux from the permanent magnets and the coil may be more efficiently used. For instance may the number of leakage flux paths be minimized and the flux from the permanent magnets may be utilized to a greater extent than in the known modulated pole machines. In relation to other electrical machines a machine as above may produce more torque. Yet another advantage is that all of the Magneto Motive Force (MMF) of the coil may be available for every pole which may result in high electric loading and high output for specific size and/or cost.

According to another aspect of the invention an electrical, rotary machine comprises a plurality of phase sections, each including the features of the electrical machine above.

The advantage of this is, in addition to the ones above, that such a machine may be enabled to provide substantially constant torque, which may be advantageous in certain applications.

In one embodiment the pole sections are made of soft magnetic powder. By making the pole sections from soft magnetic powder the manufacturing of the rotor may be simplified and magnetic flux concentration, utilizing the advantage of effective three dimensional flux paths, may be more efficient.

In a further embodiment a flux bridge is arranged between the two stator core sections and this flux bridge is a stator yoke section arranged concentrically with the first and second circular stator core sections. By arranging such a stator core section the manufacturing process of the parts of the stator assembly and the assembling process of the stator assembly may be facilitated and more cost-effective.

A further scope of applicability of the present invention will become apparent from the detailed description given below. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

Other features and advantages of the present invention will become apparent from the following detailed description of a presently preferred embodiment, with reference to the accompanying drawings, in which.

DETAILED DESCRIPTION OF EMBODIMENTS

Figure 1:
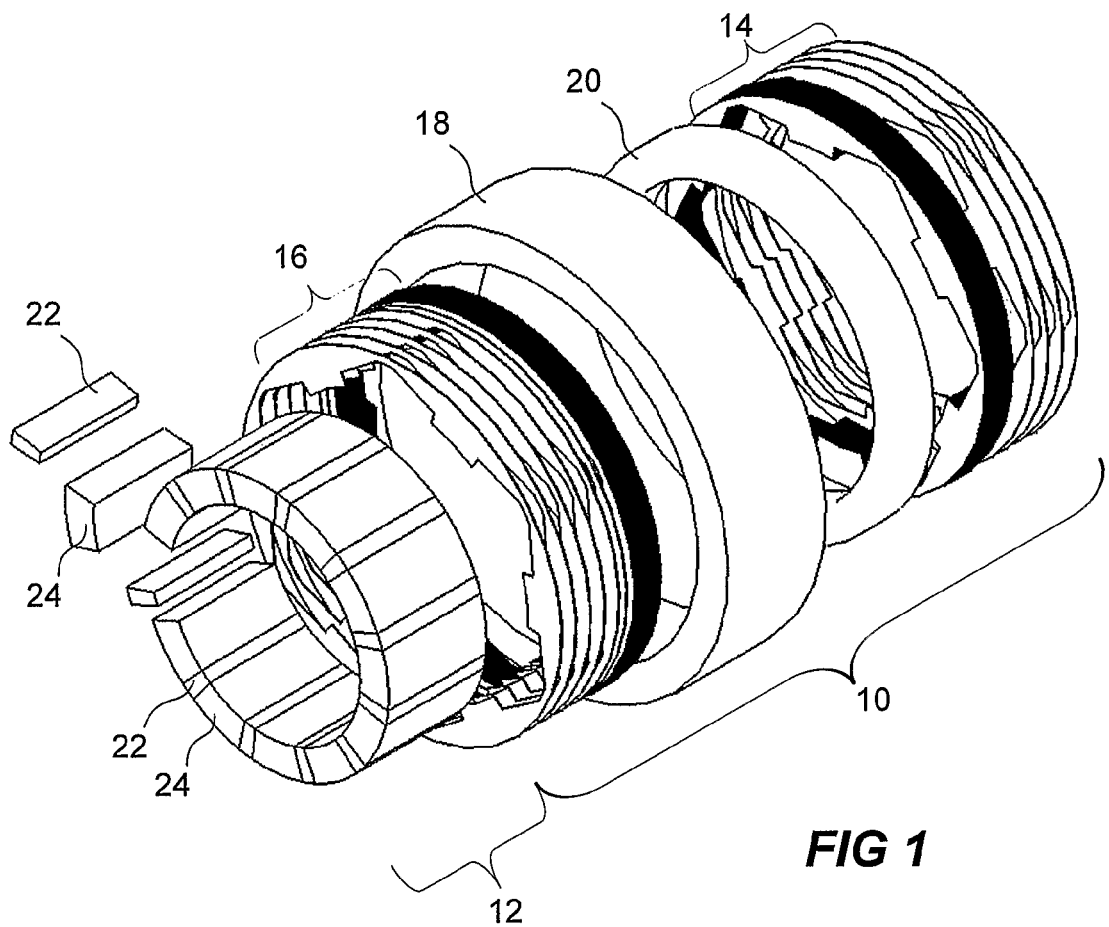
FIG. 1 is a schematic, exploded, perspective view of a radial electrical, rotary machine according to one embodiment of one aspect of the invention.
Figure 2:
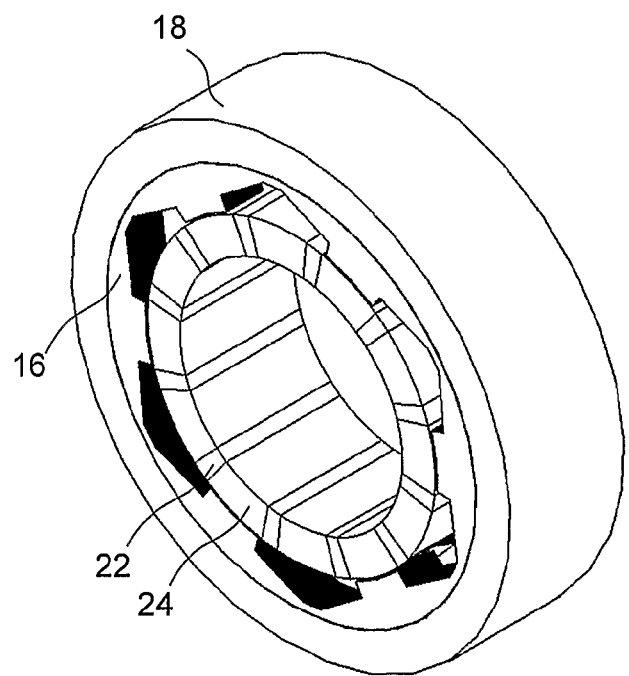
FIG. 2 is a schematic, perspective view of the electrical, rotary machine in FIG. 1.
Figure 3:
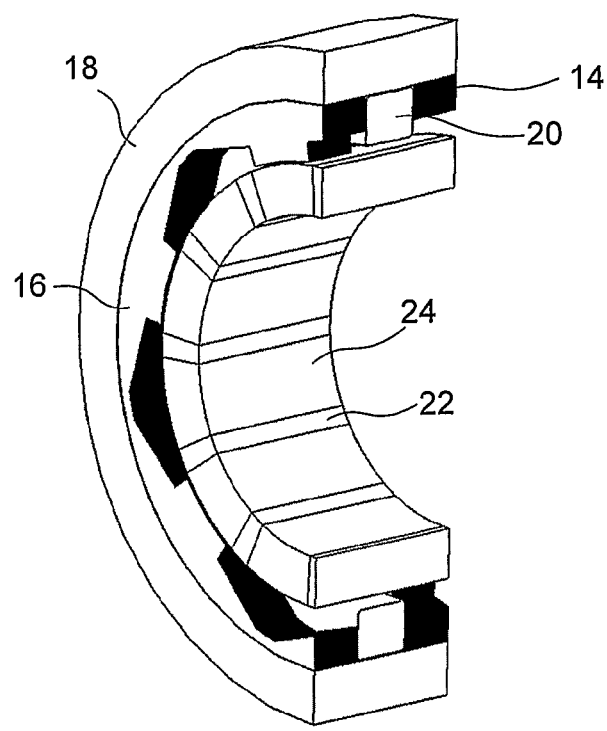
FIG. 3 is a cross-sectional view of the electrical, rotary machine in FIG. 2.

FIGS. 1-3 shows one embodiment of the rotary machine according to the invention. This embodiment comprises a stator assembly 10 and a rotor 12.

The stator assembly includes a first stator core section 14, a second stator core section 16, a stator yoke section 18 and a coil 20.

The rotor includes permanent magnets 22 and pole sections 24.

The stator yoke section 18 of the stator is arranged to provide a magnetic flux path between the first and second stator core sections 14,16, thereby acting as a "flux bridge". The material used for the stator yoke section 18 may be soft magnetic powder in order to facilitate the assembly of the stator and to provide a relatively low reluctance transition between the two stator core sections 14, 16.

Figure 4:
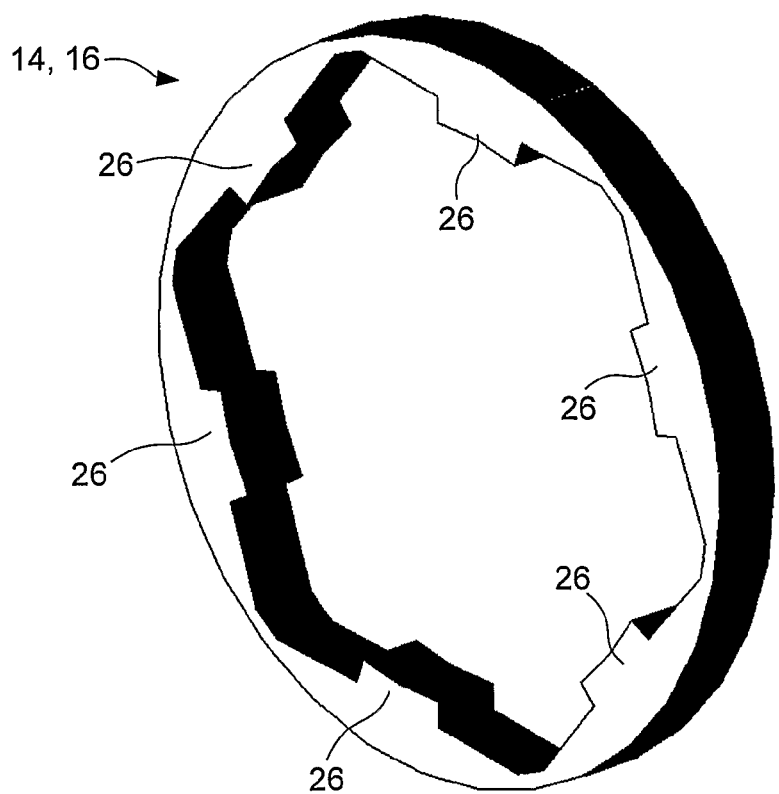
FIG. 4 is a schematic view of a stator core section of the electrical, rotary machine in FIGS. 1-3.

In FIG. 4 an embodiment of the stator core sections 14, 16 used in the embodiment of FIGS. 1-3 is shown. The figure only shows one stator core section. However, according to one embodiment the two stator core sections 14, 16 are substantially identical. Each stator core section is essentially circular in shape and includes a plurality of radially extending teeth 26. The teeth 26 are arranged to extend towards the rotor 12 for forming a closed circuit flux path with the rotor 12. In FIG. 4 the teeth are shown as extending inwards towards an inner rotor. However in one embodiment, not shown, it is possible to arrange the rotor outside the stator core sections 14, 16 and therefore arranging the teeth extending radially outwards instead.

In the embodiment depicted in FIGS. 1 and 4 the stator core sections 14, 16 are laminated, i.e. made from stacked sheets of soft magnetic material separated by a thin electrical insulation. The general technique of laminating stator cores is well known to persons skilled in the art. According to one embodiment the laminated core sections 14, 16 may be made from strips or elongated sheets of soft magnetic material in which the teeth has been formed, e.g. by removing the material from the area between the teeth by punching. Then, either each formed sheet or a plurality of formed sheets is bent in a direction parallel to the plane into a circular shape. A corresponding manufacturing technique for an axial flux machine is described in WO 2004/093291 A1, Höganäs AB. The difference between the present laminated core back sections and the core back sections of WO 2004/093291 A1 is that the sheets of the present core back also forms the teeth of the core back unlike the sheets of the WO 2004/093291 A1 document which include openings, each arranged to receive a separately manufactured tooth. Manufacturing the core back sections in this way result in less scrap and, thus, the soft magnetic material is used more efficiently.

Figure 5:
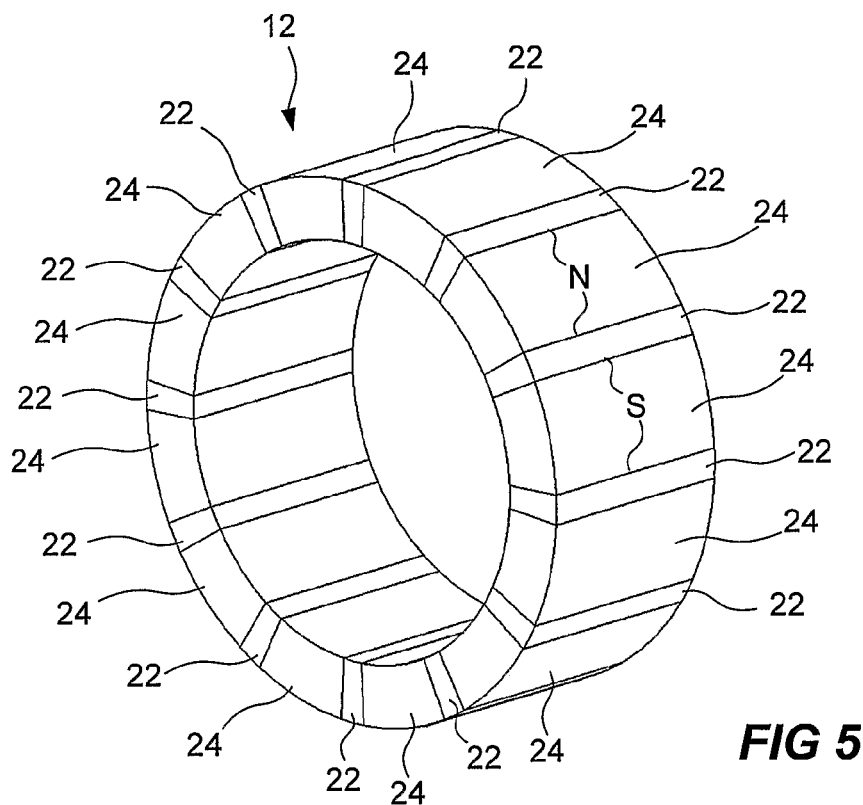
FIG. 5 is a schematic, perspective view of a rotor of the electrical, rotary machine in FIGS. 1-3.

In FIG. 5 an embodiment of the rotor 12 used in the embodiment of FIGS. 1-3 is shown. The rotor 12 comprises sections of permanent magnets 22 and pole sections 24 made from soft magnetic material. The pole sections 24 are arranged between the permanent magnets 22, thereby separating the permanent magnets 22 from each other.

In the embodiment shown in FIG. 5 the permanent magnets 22 and the pole sections 24 extends substantially the same distance in the axial direction of the rotor.

The permanent magnets are arranged so that the magnetization direction of the permanent magnets are substantially circumferential, i.e. the north and south pole, respectively, is facing in a substantially circumferential direction.

Further, every second permanent magnet 22, counted circumferentially, is arranged having its magnetization direction in the opposite direction in relation to the other permanent magnets. Accordingly, the north pole N of one permanent magnet 22 will face the north pole N of one of the neighboring permanent magnet 22. In the same manner the south pole S of one permanent magnet 22 will face the south pole S of a neighboring permanent magnet 22.

This design of the rotor 12 have the advantage of enabling flux concentration from the permanent magnets 22 so that the surface of the rotor 12 facing the tooth 26 of the stator 10 may present the total magnetic flux from both of the neighboring permanent magnets 22 to the surface of the facing tooth 26. The flux concentration may be seen as a function of the area of the permanent magnets 22 facing each pole section 24 divided with the area facing a tooth. These flux concentration properties of each pole section 24 makes it possible to use weak low cost permanent magnets as permanent magnets 22 in the rotor and makes it possible to achieve very high air gap flux densities. The flux concentration may be facilitated by the pole section being made from soft magnetic powder enabling effective three dimensional flux paths. Further, the design also makes it possible to make more efficient use of the magnets than in corresponding types of machines. Yet another advantage of the design is that the magnets see substantially the same reluctance independent of the rotor position alleviating problems with pulsating flux.

Figure 6:
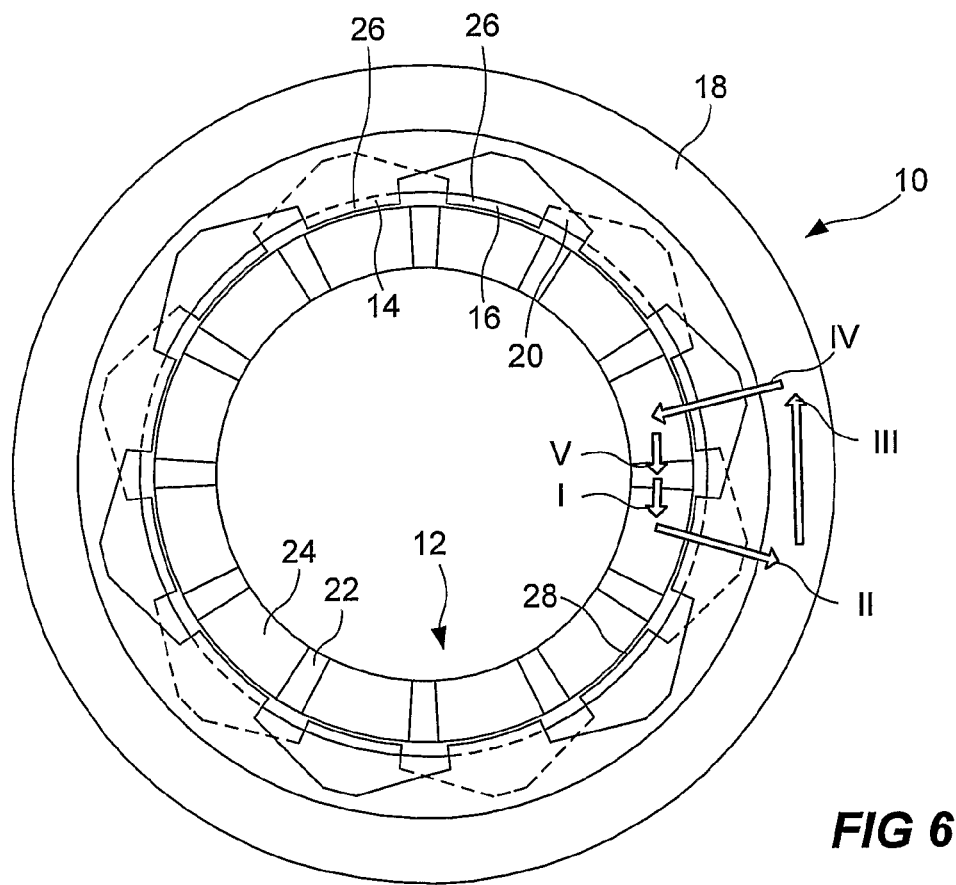
FIG. 6 is a schematic plan view, in the axial direction, of the electrical, rotary machine in FIGS. 1-3, the view also schematically depict a magnetic flux path.

According to the above embodiment, see FIG. 1 and FIG. 6, the first and second stator core sections 14, 16 are axially displaced in relation to each other and they are arranged around a common axis. The coil 20 is arranged between the two stator core sections 14, 16. The advantage of arranging the coil like this is that all of the MMF (Magneto Motive Force) is seen by every pole and, thus, results in high electric loading and high output for given size and/or cost. The stator yoke section 18 is arranged concentrically to the two stator sections 14, 16. The stator yoke section 18 is substantially of a length, in the axial direction, corresponding to the length of the assembly of the two stator core sections 14, 16 and the coil 20, in order to be arranged as a flux bridge between the two stator core sections 14, 16. By making the stator yoke section 18 from soft magnetic powder the efficiency of the three dimensional flux path going from the stator core section 14, 16 to the stator yoke section 18 is increased in relation to an embodiment where the stator yoke section is made from laminates.

Further, one of the two stator core sections are rotationally displaced in relation to the other stator core section. This displacement results in that the teeth 26 of one of the stator core sections is positioned at a circumferential position different from the circumferential position of the teeth of the other stator core section. This is shown in FIG. 6 where the first stator core section 14 is positioned, from this view point, in front of the coil 20 and the second stator core section 16 is positioned behind the coil. The hidden portions of the second stator core section 16 is indicated by broken lines. In the embodiment depicted by FIG. 6 each tooth of one of the stator core sections 14, 16 is positioned, in the circumferential direction, in the middle of the gap between two teeth of the other stator section.

The described arrangement of the stator assembly 10 has the advantage of being easy to assemble and the parts is easy to manufacture.

The rotor 12 is then arranged on an axle 50 or shaft, not shown, and positioned in the center of the stator assembly 10 or, if the rotor is an outer rotor type, around the stator assembly.

The concept of displacing the teeth of one stator core section in relation to the teeth of the other stator core section is advantageous in order to make effective use of the above described and most effective rotor design. The flux path of the system may be described as follow, referring to FIG. 6, when starting from a permanent magnet 22:

I) the flux path is initially circumferential and pointing out of the permanent magnet 22 into the neighboring pole section 24, where flux concentration may occur, in the pole section 24 the flux path may be circumferential and partially axial in order to concentrate the magnetic flux from the facing area of the permanent magnet 22 to the position of a tooth 26 of the first stator core section 14, II) then the flux path turns to a radial direction out of the pole section 24, across an air gap 28 through the tooth of the first stator core section 14 and radially and partially circumferentially into the flux bridge, in this case the stator yoke section 18, III) then the flux path turns to an axial and circumferential direction through the flux bridge towards a neighboring tooth of the second stator core section 16, IV) then the flux path turns to a radial direction through the tooth of the second stator core section 16, across the air 28 gap between this tooth and the rotor and into the pole section 24 on the other side of the permanent magnet 22, V) then the flux path turn to a circumferential direction and return to the permanent magnet 22.

Corresponding paths can be described and drawn for each permanent magnet, but only one is shown in order to facilitate the understanding.

According to one embodiment of the invention the teeth 26 of one stator core section 14 are axially separated from the teeth 26 of the other stator core section 16 by a circumferentially extending gap. The gap extends circumferentially and is not interrupted by teeth 26 of a first stator core section 14 extending axially into the space in between the teeth 26 of the second stator core section 16. In other words the gap describes an unbroken ring.

The coil 20 which is arranged between the two stator core sections 14,16 may be supplied with different voltages for operation, e.g. sinusoidal or square wave.

According to another aspect of the invention the general design of the radial electrical, rotary machine described in accordance with FIGS. 1-6 may be used in an axial electrical, rotary machine. The general properties and the advantages are the same for the axial electrical, rotary machine as for the radial electrical, rotary machine. However, the axial electrical, rotary machine may present additional advantages which will be described below.

In FIGS. 7-10 an axial electrical, rotary machine according to one aspect and embodiment of the present invention and parts thereof is shown. The axial electrical, rotary machine, as well as the radial one, includes a stator assembly 60 and a rotor 62. The essential differences between the radial electrical, rotary machine and this axial electrical, rotary machine is that the first and second stator core sections 64, 66 of the axial electrical, rotary machine includes axial protruding teeth 76. Additionally, the first stator core section 64 is encircling the second stator core section 66 and both are arranged at substantially the same axial position, which is evident from FIGS. 8 and 9. The coil 70, which is substantially identical to the coil of the radial electrical, rotary machine, is arranged between the first and second stator core sections 64, 66, i.e. the coil is surrounding the circumference of the second stator core section 66 and is surrounded by the first stator core section 64. The flux bridge or stator yoke section 68 is arranged onto both the first and second stator core sections 64, 66 from the axial direction and onto the end not facing the rotor 62.

Figure 7:
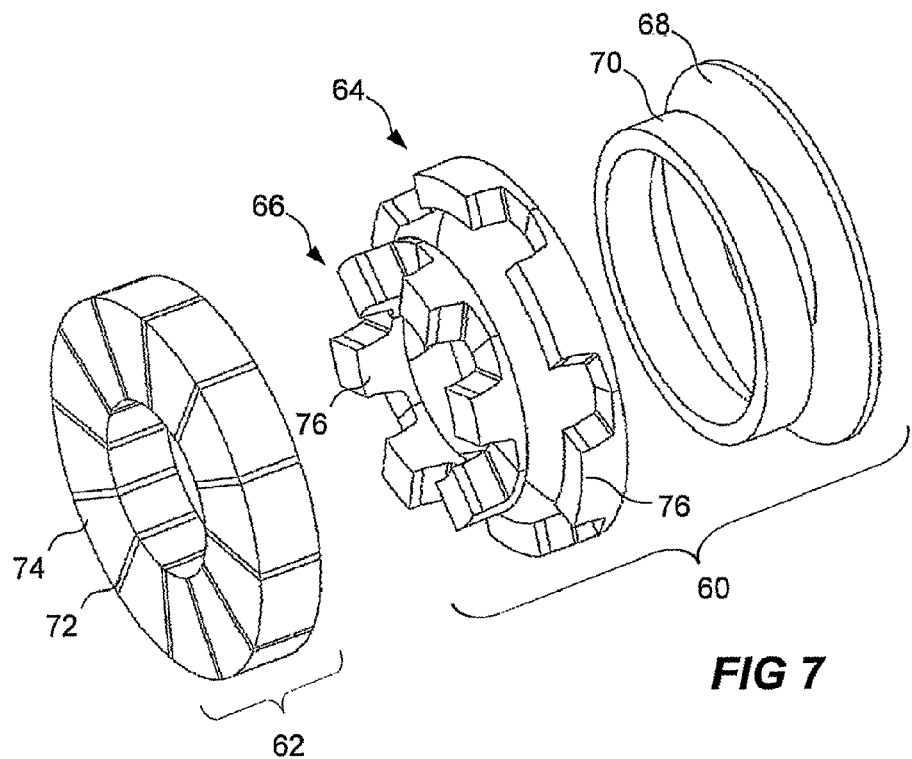
FIG. 7 is a schematic, exploded, perspective view of an axial electrical, rotary machine according to one embodiment of one aspect of the invention.
Figure 9:
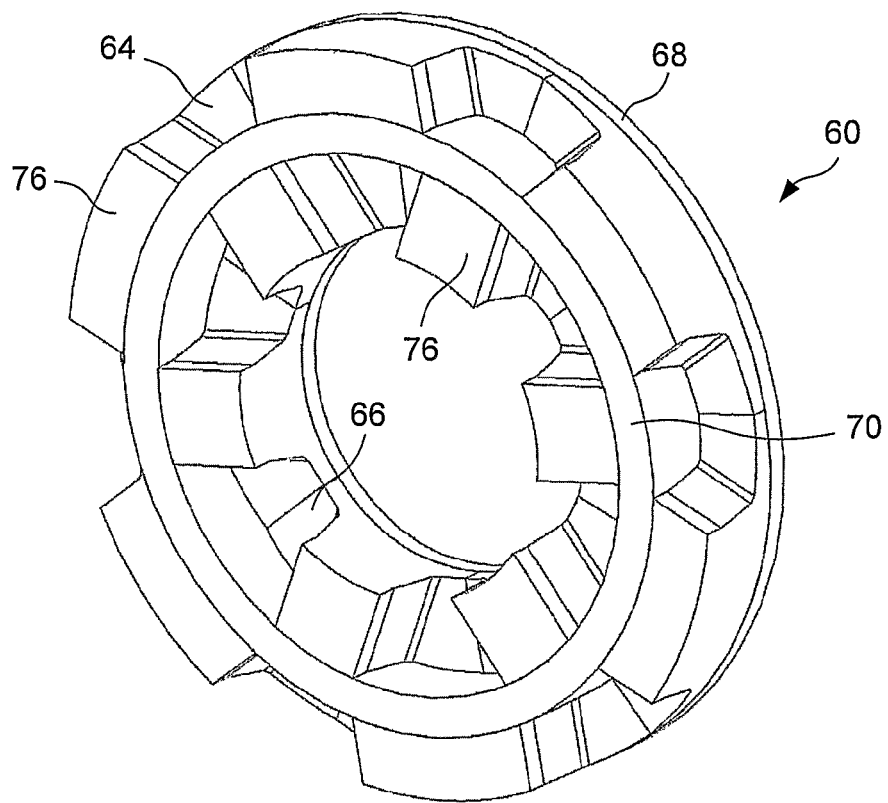
FIG. 9 is a schematic perspective view of the stator assembly of the electrical, rotary machine in FIG. 7.

As clearly seen in FIGS. 7 and 9 the radial width of the first stator core section 64 and the second stator core section 66 may differ. The stator core sections 64, 66 are given different radial width in order to make the area of the cross sectional area experienced by the magnetic flux passing through these flux paths substantially identical and thereby optimize the flux path of the stator assembly 60. Accordingly, the teeth of the first stator core section 64 are longer in the circumferential direction and shorter in the radial direction than the teeth of the second stator core section.

The teeth 76 of the second stator core section 66 are circumferentially displaced in relation to the teeth 76 of the first stator core section 64, as in the radial electrical, rotary machine, see FIG. 9. Hence, when a tooth 76 of the first stator core section 64 is facing a specific pole section 74 of the rotor 62 no tooth 76 of the second stator core section 66 is facing the same pole section 74.

The selection of material and composition of the stator assembly 60 may be identical to any embodiment described in connection with the radial electrical, rotary machine. However, the lamination direction of the stator core sections 64, 66 differs in that the sheets of the lamination is extending in an axial direction. Thereby the stator core sections 64, 66 may be made from elongated sheets which are bent, in a direction corresponding to the normal of the plane of the sheet, into rings or spirals and assembled to ring shaped stator core sections.

Figure 10:
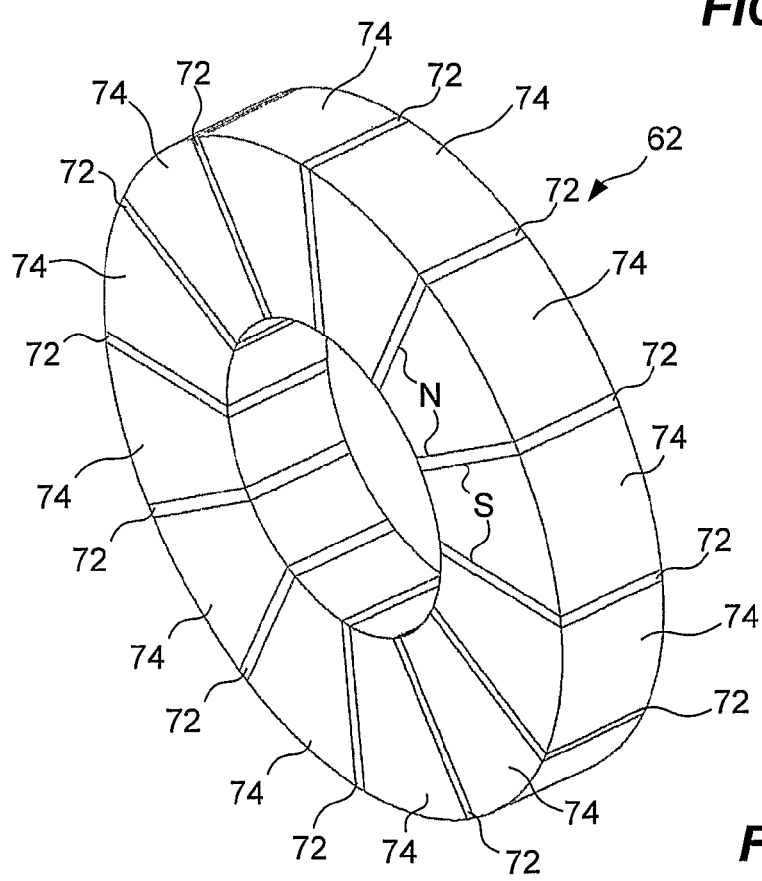
FIG. 10 is a schematic perspective view of the rotor of the electrical, rotary machine in FIG. 7.

The rotor 62 also comprises permanent magnets 72 and pole sections 74 which is arranged in a similar fashion as for the rotor of the radial electrical, rotary machine, see FIGS. 5 and 10. Thus, the poles of the permanent magnets are directed in a circumferential direction. The material used in the rotor may be identical to the material described in the embodiments of the radial electrical, rotary machine.

Figure 8:
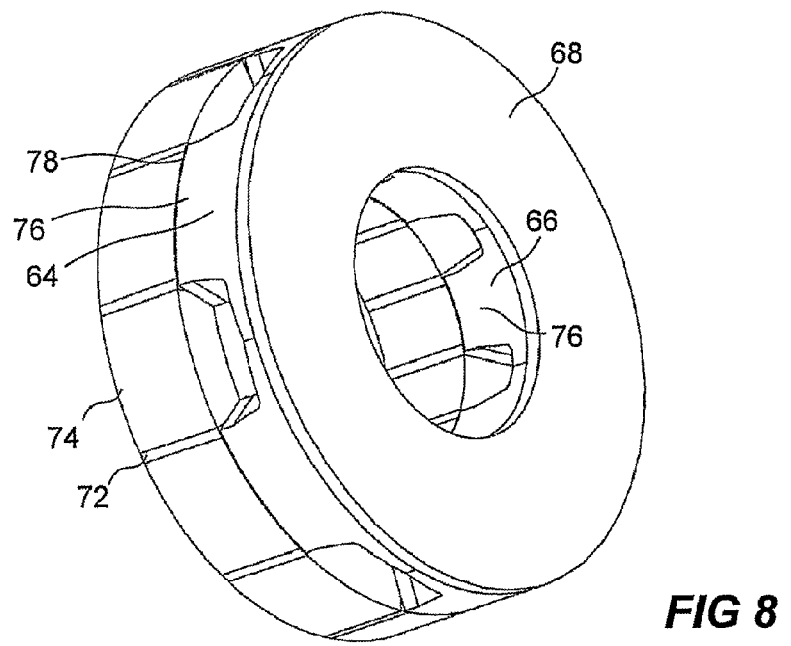
FIG. 8 is a schematic, perspective view of the electrical, rotary machine in FIG. 7.

The rotor 62 of this embodiment is arranged to pass and receive the magnetic flux from and to one of two axially directed surfaces which is facing the teeth of the stator core sections 64, 66 via the air gap 78 to and from the teeth of the stator core sections 64, 66, see FIGS. 1, 8 and 10. Thus, the rotor 62 of the axial electrical, rotary machine is arranged to distribute and receive magnetic flux in an axial direction while the rotor 12 of the radial electrical, rotary machine was arranged to distribute and receive magnetic flux in an radial direction. This may result in that the rotor 62 of the axial electrical, rotary machine may be wider in the radial direction than in the radial electrical, rotary machine, in order to provide enough interaction area facing the teeth. However, it may be possible to make the rotor 62 small in the axial direction enabling a flat motor design. Hence, it would even be possible to make such a motor requiring such small amount of axial space that it may be fit in the wheel of a vehicle.

According to one embodiment of the invention the teeth 76 of one stator core section 64 are radially separated from the teeth 76 of the other stator core section 66 by a circumferentially extending gap. The gap extends circumferentially and is not interrupted by teeth 76 of a first stator core section 64 extending axially into the space in between the teeth 76 of the second stator core section 66. In other words the gap describes an unbroken ring.

Further embodiments of the stator core sections of any one of the radial or axial electrical, rotary machine are possible and may in some cases be advantageous. For example, each of the stator core sections 14, 16; 64, 66 may be made from soft magnetic powder. If the stator core sections are made from soft magnetic powder the stator yoke section 18; 68 may be removed and the magnetic flux bridging functionality may be incorporated in the stator core sections 14, 16; 64, 66. This may be achieved by forming the stator core sections 14, 16; 64, 66 to include a circumferentially and substantially continuously arranged protrusion in each of the stator core sections 14, 16; 64, 66. The protrusion being arranged to protrude towards the other stator core section 14, 16; 64, 66. Such a design is advantageous in that the process of assembling the stator assembly is further facilitated.

In some applications there may, however, be an advantage in making the stator core section 14, 16; 64, 66 from laminates and the stator yoke section 18; 68 from soft magnetic powder. One such advantage may be that the laminates, for the time being, have better permeability than soft magnetic powder in two dimensional flux paths and the soft magnetic powder having better properties for the parts requiring three dimensional flux paths. Accordingly, the combination of the two materials, laminates and soft magnetic powder, makes it possible to provide efficient magnetic flux paths. Hence, a machine produced accordingly may have an increased power density, i.e. ratio of produced force to the spatial volume of the motor. Further, the ohmic losses is decreased in a machine combining the two material as above, this is a result of that less current is required to produce desired torque. By using laminates in the stator core sections 14, 16; 64, 66 a structure that are able to withstand greater twisting forces than the soft magnetic powder structure is achieved.

The efficiency of the machine may be further increased by forming a stator yoke section 18; 68 from a laminated portion arranged between two magnetic flux connection portions made from soft magnetic powder. Each of the magnetic flux connection portions may be arranged on each of the stator core sections in order to couple the magnetic flux, by means of the three dimensional magnetic flux conducting properties, to the laminated portion.

According to yet another embodiment the entire yoke section 18; 68 is made of laminations. The lamination is arranged so that the extension of the lamination sheets is radial and axial, i.e. a normal to the plane of the sheet is pointing in a substantially circumferential direction. Such lamination sheets may be wedge shaped or there may be slots arranged between the sheets.

According to one embodiment the soft magnetic powder components or parts may be compacted or sintered to the desired shape, depending on the soft magnetic material used. The resulting components or parts should present a resistivity of at least 1 µΩm. Further, according to another embodiment the density of the stator parts may be at least 6500 kg/m$^3$. Some examples of soft magnetic powders that may be used in order to make stator parts by means of compacting are Somaloy 500, Somaloy 550 and Permite 75 from Höganäs AB, S-263 83 Höganäs, Sweden.

Figure 18:
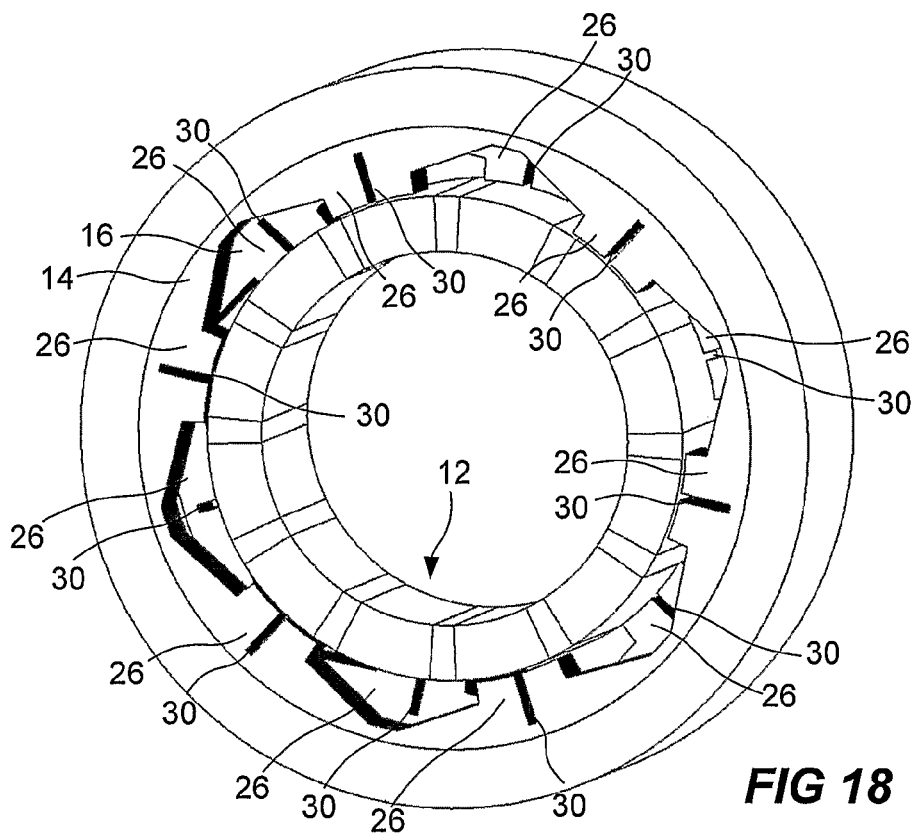
FIG. 18 is a schematic perspective view of a electrical rotary machine according to one embodiment of the invention.
Figure 19:
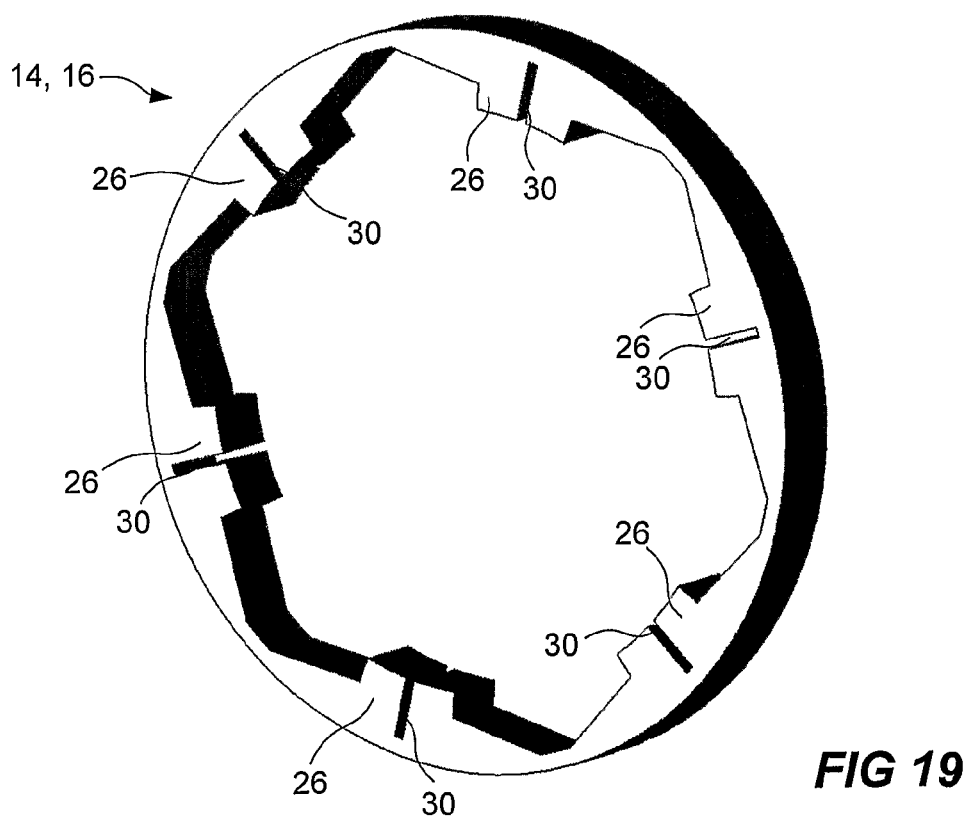
FIG. 19 is a schematic perspective view of a stator section of the rotary machine of FIG. 18.

According to yet another embodiment there are arranged slots 30 in a plurality of teeth 26 of the stator core sections 14, 16, see FIGS. 18,19. The slots 30 are arranged extending in an axial and radial direction in each of the plurality of teeth 26. By arranging such slots 30 leakage from the permanent magnet to a non desirable surface of the tooth is decreased. Such an undesired surface may be the surfaces extending from the back of a stator core section to the tip of the tooth, i.e. not the surface facing the rotor.

All of FIGS. 1-3 and 6-8 shows single phase machines which may be very useful for some applications. Such a machine will produce unidirectional but pulsing torque, in the form (1+cos 2ωt). By combining two or more single phase machines and separate them by the correct spatial and time phase angle the resulting machine will be able to produce substantially constant torque. The number of phases that may be combined is only limited by practical considerations.

Figure 11:
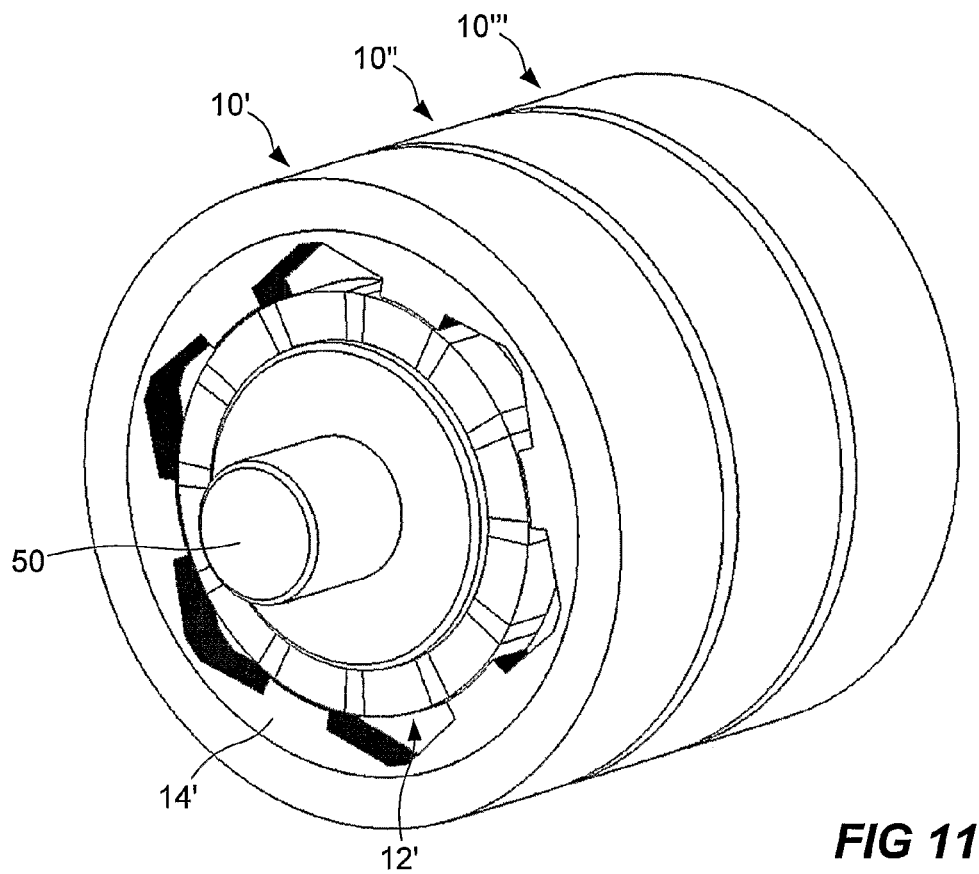
FIG. 11 is a schematic, perspective view of a three phase rotary machine according to one embodiment of a second aspect of the invention.
Figure 12:
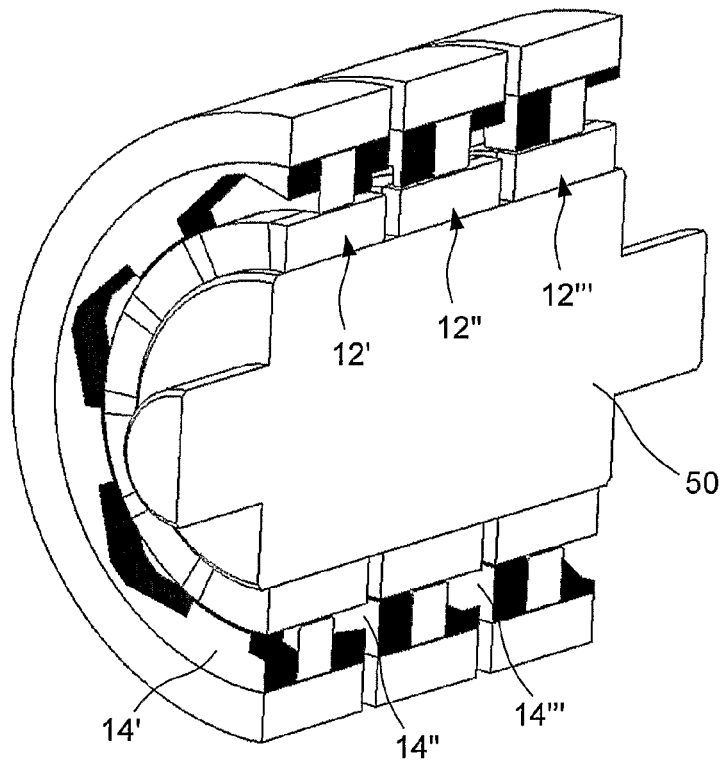
FIG. 12 is a perspective, cross-sectional view of the three phase rotary machine of FIG. 11.

In FIG. 11-12 an example of a multiple phase radial machine, in this case a 3-phase machine, according to the invention is shown. The reference numerals correspond to the reference numerals of the single phase radial machine with the difference that ' refers to a feature of a first phase, " to a feature of a second phase and '" to a feature of a third phase. In these figures an axle 50 onto which the rotor is mounted is shown. Each of the phase sections, i.e. single phase machines as described earlier in the description, is shown including a rotor of its own, i.e. each phase section corresponds completely to the earlier described single phase machines. However, one single rotor may be arranged for interaction with all three phase sections, i.e. a rotor as described previously in connection with the radial single phase machine is extended in the axial direction in order to interact with all three phase sections. Further, the figures only show a variant made of radial electrical machines, however, each radial phase section may be exchanged for an axial phase section.

Figure 13:
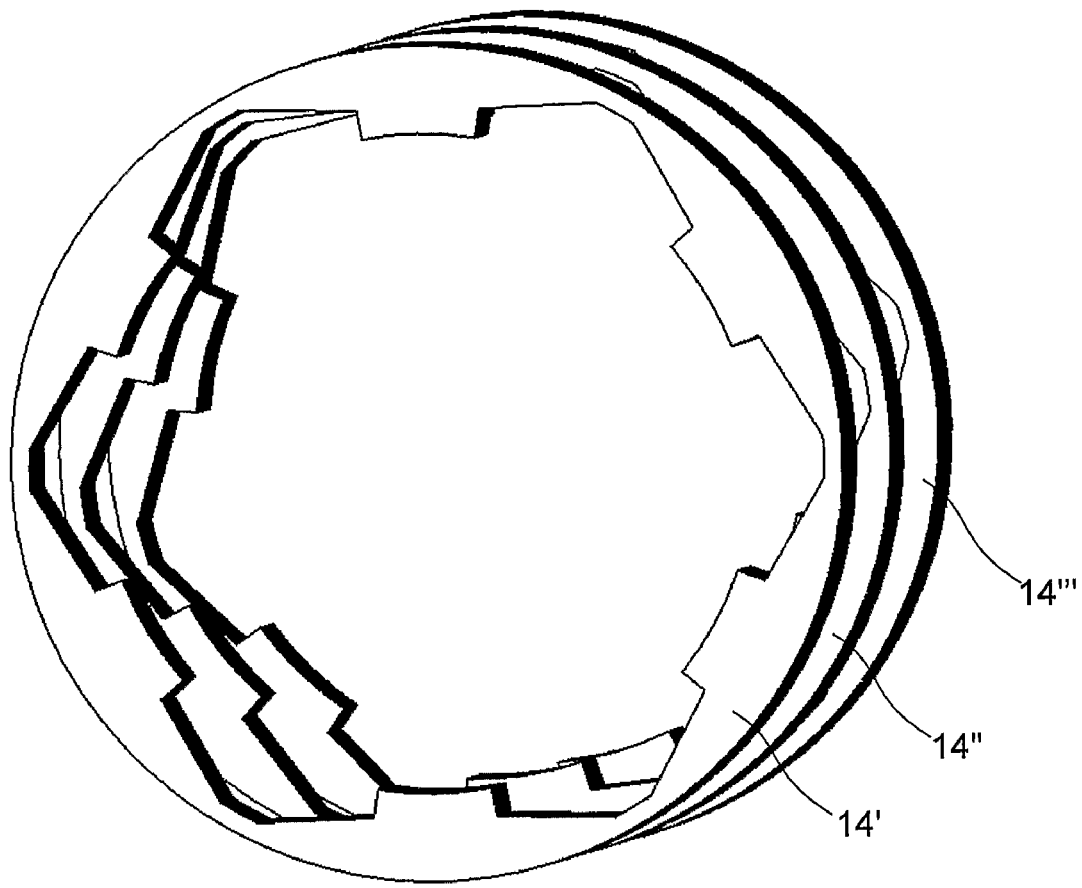
FIG. 13 is a schematic view of first stator core sections of each phase of the three phase rotary machine in FIG. 11, the figure depicts a possible spatial difference between different phases.

In FIG. 13 an example of spatial separation between phases is shown. In the figure the first stator core section 14', 14", 14''' of each phase is shown. The spatial separation in this example relates to the teeth of the stator core section of one phase being circumferentially displaced in relation to the teeth of the stator core section of the other phases.

Figure 14:
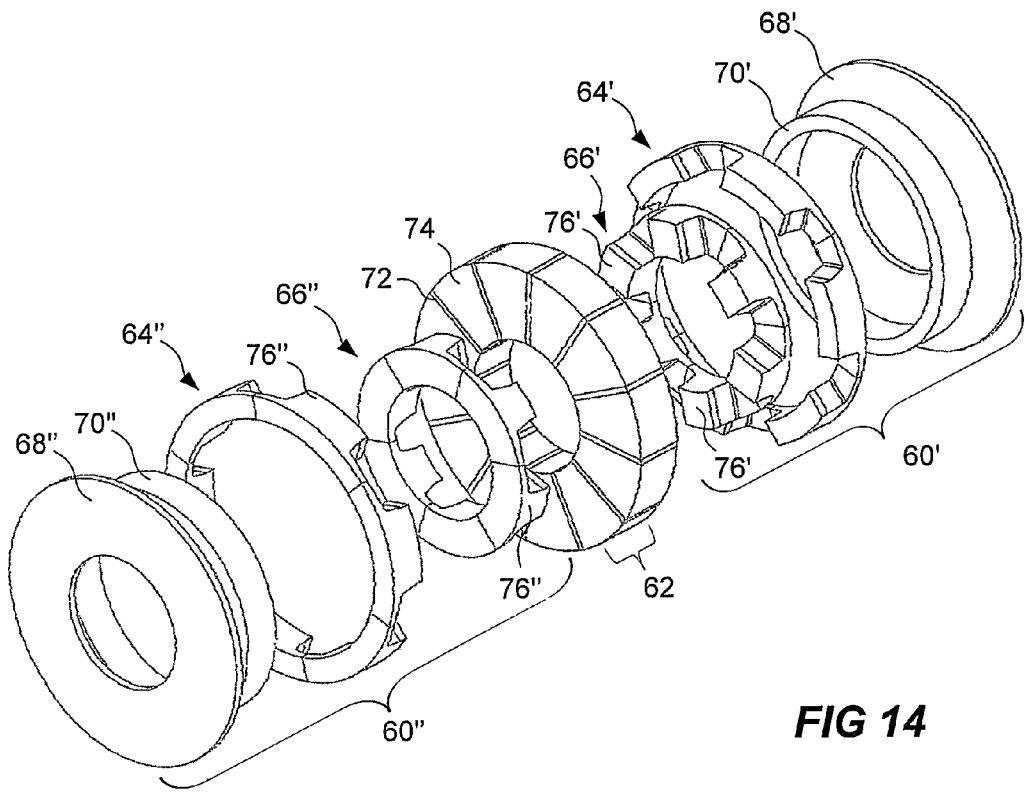
FIG. 14 is a schematic, exploded, perspective view of a two phase axial electrical, rotary machine according to one embodiment of the invention.
Figure 15:
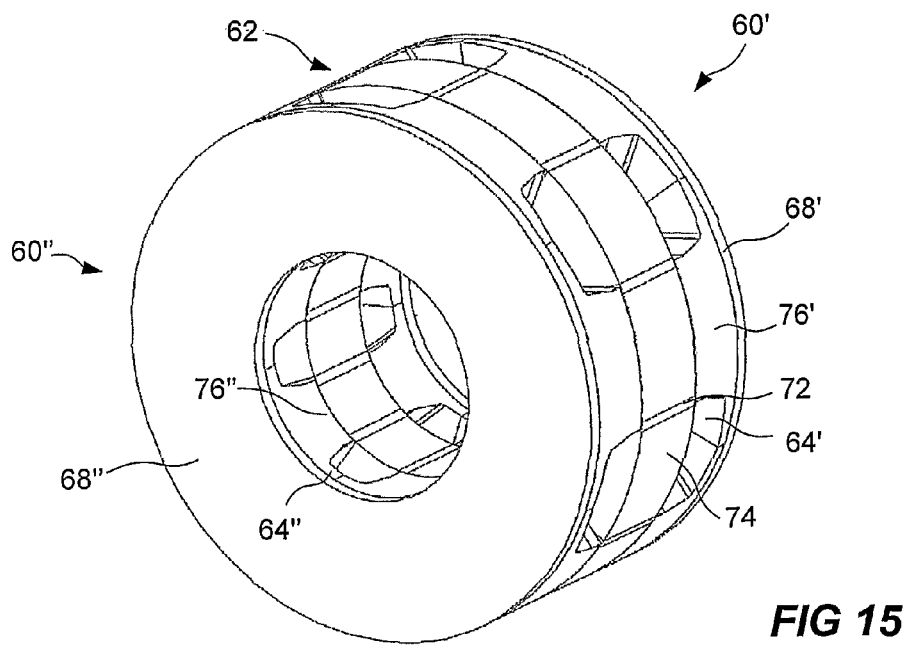
FIG. 15 is a schematic, perspective view of the two phase, electrical, rotary machine in FIG. 14.

In FIG. 14-15 an embodiment of a two phase electrical machine utilizing axial phase-sections, i.e. the axial electrical machine described in connection with FIGS. 7-10, is shown. The reference numerals correspond to the reference numerals of the single phase axial machine with the difference that ' refers to a feature of a first phase section, " to a feature of a second phase section. In this embodiment stator assemblies 60' and 60" is arranged having their teeth 76', 76" facing the other stator assembly. The two stator assemblies 60' and 60" are arranged to share the same rotor 62. This embodiment is advantageous in that it becomes very compact, at least in the axial direction, includes relatively few parts, i.e. easy to assemble, and still it exhibits the advantages described earlier.

Figure 16:
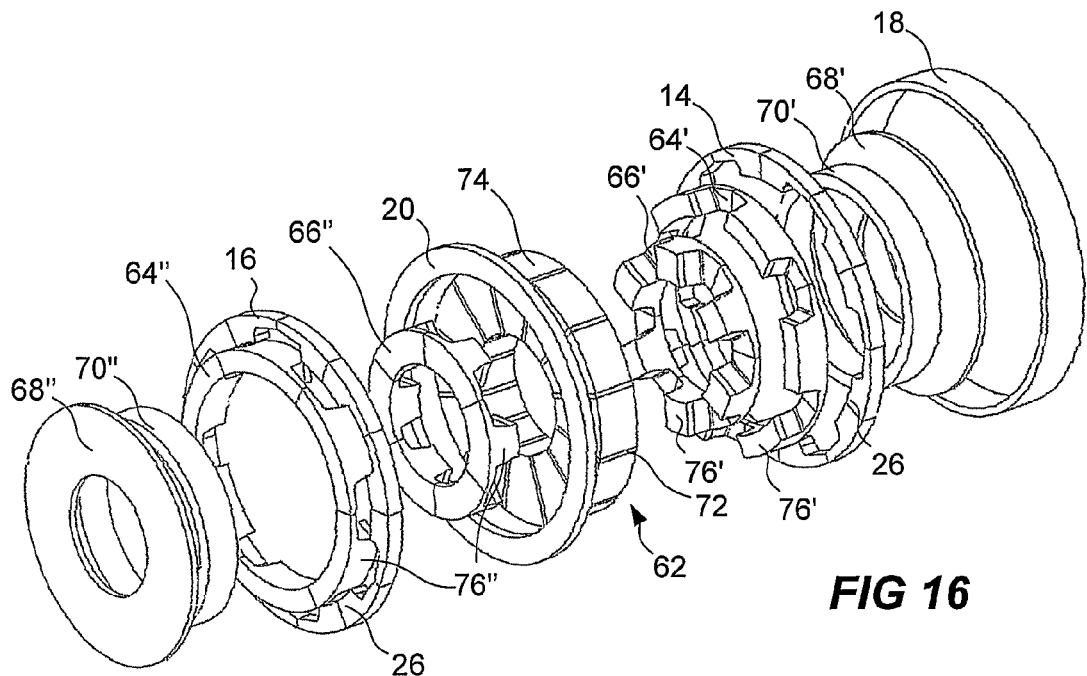
FIG. 16 is a schematic, exploded, perspective view of a three phase electrical, rotary machine according to one embodiment of the invention.
Figure 17:
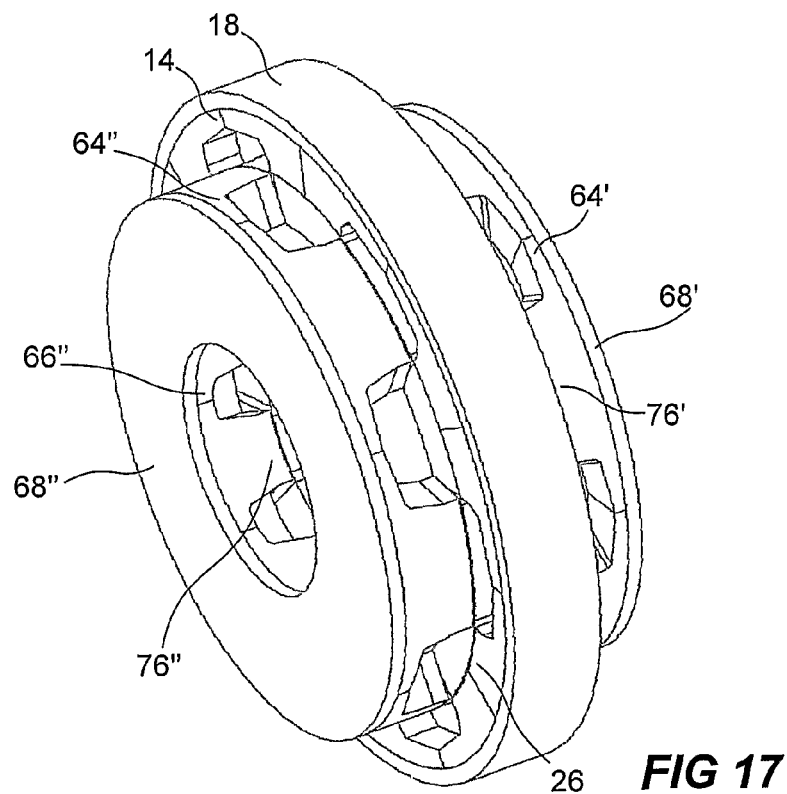
FIG. 17 is a schematic, perspective view of the three phase electrical, rotary machine in FIG. 16.

In FIG. 16-17 another embodiment of a three phase electrical machine according to the invention is shown. This embodiment includes two axial phase sections and one radial phase section and one rotor arranged to enable that magnetic flux is sent and received in both an axial and a radial direction to stator assemblies according to the invention. In the figures the reference numerals correspond to the reference numerals of the single phase axial machine and the single phase radial machine with the difference that ' refers to a feature of a first axial phase section, " to a feature of a second axial phase section. By designing the electrical machine like this it is possible to produce a very compact three phase electrical machine that is easy to assemble and still present the advantageous characteristics of the electrical, rotary machine according to the present invention.

This invention may be seen as relating to a more efficient design of a modulated pole machine. The description provided gives example implementations of the invention. The description is not to be interpreted in a limiting sense. Variations and modifications that do not necessarily depart from the scope and spirit of the invention may become apparent to those skilled in the art.

The invention claimed is:

1. An electrical, rotary machine, said machine comprising:
   a first stator core section being substantially circular and including a plurality of teeth,
   a second stator core section being substantially circular and including a plurality of teeth,
   a coil arranged between the first and second circular stator core sections, and
   a rotor including a plurality of permanent magnets,
   wherein the first stator core section, the second stator core section, the coil and the rotor are encircling a common geometric axis, and wherein the plurality of teeth of the first stator core section and the second stator core section are arranged to protrude towards the rotor,
   wherein the teeth of the second stator core section are circumferentially displaced in relation to the teeth of the first stator core section, and the entirety of the teeth of the second stator core section are axially separated from the entirety of the teeth of the first stator core section by a circumferentially extending area, the area extending circumferentially and not being interrupted by teeth from the first or second stator core section, the area forming a ring unbroken by the teeth from the first or second stator core section,
   wherein the permanent magnets in the rotor are separated in the circumferential direction from each other by axially extending pole sections made from soft magnetic material,
   wherein the axially extending pole sections that separate the permanent magnets extend axially to both the first and second stator core sections, and
   wherein the magnetization direction of the permanent magnets of the rotor is substantially circumferential so as to cause the magnetic flux path generated in an axially extending pole section during use of the electrical rotary machine to extend at least circumferentially and axially and to concentrate the magnetic flux from a facing area of the adjacent permanent magnets to a position of a tooth of one of the stator sections,
   wherein each tooth of the first stator core section is circumferentially positioned in the middle of the gap formed between two teeth of the second stator core section.

2. Electrical machine according to claim 1, wherein the magnetization direction of every second permanent magnet is opposite to the magnetization direction of the permanent magnet in between.

3. Electrical machine according to claim 1, wherein the pole sections are made of soft magnetic powder.

4. Electrical machine according to claim 1, wherein a flux bridge is arranged between the first and second circular stator core sections for providing a flux path between said circular stator core sections.

5. Electrical machine according to claim 4, wherein the flux bridge is a stator yoke section arranged to encircle said common geometric axis.

6. Electrical machine according to claim 5, wherein the stator yoke section is made of soft magnetic powder.

7. Electrical machine according to claim 1, wherein said stator core sections are made of laminated sheets of soft magnetic material and sheets of electrical insulation.

8. Electrical machine according to claim 1, wherein said stator core sections are made of soft magnetic powder.

9. Electrical machine according to claim 1, wherein the teeth of the first stator section and the second stator section are protruding radially and wherein the first stator section and the second stator section are axially displaced in relation to each other.

10. An electrical, rotary machine, said machine comprising:
    a plurality of phase sections each including the features of claim 1.

11. Electrical machine according to claim 1, wherein the rotor is arranged around the first and second stator core sections and wherein the teeth extend radially outward.

12. Electrical machine according to claim 1, wherein the stator core sections are made from a soft magnetic powder and include magnetic flux bridge means incorporated therein for generating a magnetic flux path between the first and second stator core sections.

13. Electrical machine according to claim 12, wherein each stator core section includes a circumferentially and substantially continuously arranged protrusion protruding towards the corresponding other stator core section.

14. Electrical machine according to claim 1, wherein the circumferentially extending area axially separating the teeth is at least partly filled by the coil.

15. Electrical machine according to claim 1, wherein each axially extending pole section is formed as a single component extending axially across the entire stator.

16. Electrical machine according to claim 1, wherein the electrical machine is a multi-phase machine, and wherein each pole section is formed as a single component axially extending across all the phases.

17. Electrical machine according to claim 1, wherein each permanent magnet is formed as a single component extending axially across the entire stator.

18. An electrical, rotary machine, said machine comprising:
    a first stator core section being substantially circular and including a plurality of teeth,
    a second stator core section being substantially circular and including a plurality of teeth,
    a coil arranged between the first and second circular stator core sections, and
    a rotor including a plurality of permanent magnets,
    wherein the first stator core section, the second stator core section, the coil and the rotor are encircling a common geometric axis, and wherein the plurality of teeth of the first stator core section and the second stator core section are arranged to protrude towards the rotor,
    wherein the teeth of the second stator core section are circumferentially displaced in relation to the teeth of the first stator core section, and the entirety of the teeth of the second stator core section are axially separated from the entirety of the teeth of the first stator core section by a circumferentially extending area, the area extending circumferentially and not being interrupted by teeth from the first or second stator core section, the area forming a ring unbroken by the teeth from the first or second stator core section, wherein the permanent magnets in the rotor are separated in the circumferential direction from each other by axially extending pole sections made from soft magnetic powder, wherein the axially extending pole sections that separate the permanent magnets extend axially to both the first and second stator core sections, and wherein the magnetization direction of the permanent magnets of the rotor is substantially circumferential so as to cause the magnetic flux path generated in an axially extending pole section during use of the electrical rotary machine to extend at least circumferentially and axially and to concentrate the magnetic flux from a facing area of the adjacent permanent magnets to a position of a tooth of one of the stator sections, wherein the teeth of the stator core sections and the rotor pole sections are sized and arranged such that when a tooth of the first stator core section faces a first rotor pole section of the rotor, no tooth of the second stator core section faces the first rotor pole section.

19. An electrical, rotary machine, said machine comprising:
a first stator core section being substantially circular and including a plurality of teeth,
a second stator core section being substantially circular and including a plurality of teeth,
a coil arranged between the first and second circular stator core sections, and
a rotor including a plurality of permanent magnets,
wherein the first stator core section, the second stator core section, the coil and the rotor are encircling a common geometric axis, and wherein the plurality of teeth of the first stator core section and the second stator core section are arranged to protrude towards the rotor,
wherein the teeth of the second stator core section are circumferentially displaced in relation to the teeth of the first stator core section, and the entirety of the teeth of the second stator core section are axially separated from the entirety of the teeth of the first stator core section by a circumferentially extending area, the area extending circumferentially and not being interrupted by teeth from the first or second stator core section, the area forming a ring unbroken by the teeth from the first or second stator core section,
wherein the permanent magnets in the rotor are separated in the circumferential direction from each other by axially extending pole sections made from soft magnetic material, wherein the axially extending pole sections are compacted and not sintered,
wherein the axially extending pole sections that separate the permanent magnets extend axially to both the first and second stator core sections, and
wherein the magnetization direction of the permanent magnets of the rotor is substantially circumferential so as to cause the magnetic flux path generated in an axially extending pole section during use of the electrical rotary machine to extend at least circumferentially and axially and to concentrate the magnetic flux from a facing area of the adjacent permanent magnets to a position of a tooth of one of the stator sections,
wherein the teeth of the stator core sections and the rotor pole sections are sized and arranged such that when a tooth of the first stator core section faces a first rotor pole section of the rotor, no tooth of the second stator core section faces the first rotor pole section.

20. An electrical, rotary machine, said machine comprising:
a first stator core section being substantially circular and including a plurality of teeth,
a second stator core section being substantially circular and including a plurality of teeth,
a coil arranged between the first and second circular stator core sections, and
a rotor including a plurality of permanent magnets,
wherein the first stator core section, the second stator core section, the coil and the rotor are encircling a common geometric axis, and wherein the plurality of teeth of the first stator core section and the second stator core section are arranged to protrude towards the rotor,
wherein the teeth of the second stator core section are circumferentially displaced in relation to the teeth of the first stator core section, and the entirety of the teeth of the second stator core section are axially separated from the entirety of the teeth of the first stator core section by a circumferentially extending area, the area extending circumferentially and not being interrupted by teeth from the first or second stator core section, the area forming a ring unbroken by the teeth from the first or second stator core section,
wherein the permanent magnets in the rotor are separated in the circumferential direction from each other by axially extending pole sections made from soft magnetic material,
wherein the axially extending pole sections that separate the permanent magnets extend axially to both the first and second stator core sections,
wherein the magnetization direction of the permanent magnets of the rotor is substantially circumferential, and
wherein the axial extending pole section is adapted to provide a magnetic flux path extending at least circumferentially and axially causing concentration of the magnetic flux during operation of the electrical rotary machine from a facing area of the adjacent permanent magnets to a position of a tooth of one of the stator sections,
wherein the teeth of the stator core sections and the rotor pole sections are sized and arranged such that when a tooth of the first stator core section faces a first rotor pole section of the rotor, no tooth of the second stator core section faces the first rotor pole section.

21. An electrical, rotary machine, said machine comprising:
a first stator core section being substantially circular and including a plurality of teeth,
a second stator core section being substantially circular and including a plurality of teeth,
a coil arranged between the first and second circular stator core sections, and
a rotor including a plurality of permanent magnets,
wherein the first stator core section, the second stator core section, the coil and the rotor are encircling a common geometric axis, and wherein the plurality of teeth of the first stator core section and the second stator core section are arranged to protrude towards the rotor,
wherein the teeth of the second stator core section are circumferentially displaced in relation to the teeth of the first stator core section, and the entirety of the teeth of the second stator core section are axially separated from the entirety of the teeth of the first stator core section by a circumferentially extending area, the area extending circumferentially and not being interrupted by teeth from the first or second stator core section, the area forming a ring unbroken by the teeth from the first or second stator core section, wherein the permanent magnets in the rotor are separated in the circumferential direction from each other by axially extending pole sections made from soft magnetic material, wherein the axially extending pole sections that separate the permanent magnets extend axially to both the first and second stator core sections, and wherein the magnetization direction of the permanent magnets of the rotor is substantially circumferential so as to cause the magnetic flux path generated in an axially extending pole section during use of the electrical rotary machine to extend at least circumferentially and axially and to concentrate the magnetic flux from a facing area of the adjacent permanent magnets to a position of a tooth of one of the stator sections, wherein the teeth of the stator core sections and the rotor pole sections are sized and arranged such that when a tooth of the first stator core section faces a first rotor pole section of the rotor, no tooth of the second stator core section faces the first rotor pole section.

22. An electrical, rotary machine, said machine comprising:

a first stator core section being substantially circular and including a plurality of teeth, a second stator core section being substantially circular and including a plurality of teeth, a coil arranged between the first and second circular stator core sections, and a rotor including a plurality of permanent magnets, wherein the first stator core section, the second stator core section, the coil and the rotor are encircling a common geometric axis, and wherein the plurality of teeth of the first stator core section and the second stator core section are arranged to protrude towards the rotor, wherein the teeth of the second stator core section are circumferentially displaced in relation to the teeth of the first stator core section, and the entirety of the teeth of the second stator core section are axially separated from the entirety of the teeth of the first stator core section by a circumferentially extending area, the area extending circumferentially and not being interrupted by teeth from the first or second stator core section, the area forming a ring unbroken by the teeth from the first or second stator core section, wherein the permanent magnets in the rotor are separated in the circumferential direction from each other by axially extending pole sections made from soft magnetic material, wherein the axially extending pole sections are compacted and not sintered, wherein the axially extending pole sections that separate the permanent magnets extend axially to both the first and second stator core sections, and wherein the magnetization direction of the permanent magnets of the rotor is substantially circumferential so as to cause the magnetic flux path generated in an axially extending pole section during use of the electrical rotary machine to extend at least circumferentially and axially and to concentrate the magnetic flux from a facing area of the adjacent permanent magnets to a position of a tooth of one of the stator sections, wherein each tooth of the first stator core section is circumferentially positioned in the middle of the gap formed between two teeth of the second stator core section.

23. An electrical, rotary machine, said machine comprising:

a first stator core section being substantially circular and including a plurality of teeth, a second stator core section being substantially circular and including a plurality of teeth, a coil arranged between the first and second circular stator core sections, and a rotor including a plurality of permanent magnets, wherein the first stator core section, the second stator core section, the coil and the rotor are encircling a common geometric axis, and wherein the plurality of teeth of the first stator core section and the second stator core section are arranged to protrude towards the rotor, wherein the teeth of the second stator core section are circumferentially displaced in relation to the teeth of the first stator core section, and the entirety of the teeth of the second stator core section are axially separated from the entirety of the teeth of the first stator core section by a circumferentially extending area, the area extending circumferentially and not being interrupted by teeth from the first or second stator core section, the area forming a ring unbroken by the teeth from the first or second stator core section, wherein the permanent magnets in the rotor are separated in the circumferential direction from each other by axially extending pole sections made from soft magnetic material, wherein the axially extending pole sections that separate the permanent magnets extend axially to both the first and second stator core sections, wherein the magnetization direction of the permanent magnets of the rotor is substantially circumferential, and wherein the axial extending pole section is adapted to provide a magnetic flux path extending at least circumferentially and axially causing concentration of the magnetic flux during operation of the electrical rotary machine from a facing area of the adjacent permanent magnets to a position of a tooth of one of the stator sections, wherein each tooth of the first stator core section is circumferentially positioned in the middle of the gap formed between two teeth of the second stator core section.

* * * * *